(12) United States Patent
Shih

(10) Patent No.: US 7,366,917 B2
(45) Date of Patent: Apr. 29, 2008

(54) SYSTEM AND METHOD FOR ACCESSING DISCRETE DATA

(75) Inventor: Yung-Cheng Shih, Chang-Hua Hsien (TW)

(73) Assignee: Faraday Technology Corp., Hsin-Chu (TW)

( * ) Notice: Subject to any disclaimer, the term of this patent is extended or adjusted under 35 U.S.C. 154(b) by 704 days.

(21) Appl. No.: 10/711,413

(22) Filed: Sep. 17, 2004

(65) Prior Publication Data

US 2005/0235162 A1 Oct. 20, 2005

(30) Foreign Application Priority Data

Apr. 19, 2004 (TW) .................. 93110850 A

(51) Int. Cl.
G06F 11/30 (2006.01)
G06F 7/04 (2006.01)
H04L 9/00 (2006.01)
H04L 9/32 (2006.01)

(52) U.S. Cl. ............... 713/193; 713/169; 713/170; 713/171; 713/189; 713/190; 713/191; 713/192; 713/194; 726/30; 380/259; 380/260; 380/261; 380/262

(58) Field of Classification Search ........ 713/169–171, 713/189–194; 380/259–262
See application file for complete search history.

(56) References Cited

U.S. PATENT DOCUMENTS

| 5,684,876 A * | 11/1997 | Pinder et al. .................. 380/37 |
| 7,227,952 B2 * | 6/2007 | Qawami et al. ............. 380/201 |
| 2003/0026423 A1 * | 2/2003 | Unger et al. ................. 380/217 |
| 2004/0071289 A1 * | 4/2004 | Rose et al. .................... 380/37 |

* cited by examiner

Primary Examiner—Longbit Chai
(74) Attorney, Agent, or Firm—Winston Hsu

(57) ABSTRACT

A method for accessing discrete data includes transmitting a write command to a memory, determining whether each data following a header of the file needs to be encrypted according to a data format of a file that is to be written into the memory, transmitting the file header and each data following the file header to a logic unit, turning on the logic unit for encrypting the data determined to be encrypted and writing the encrypted data into the memory, turning off the logic unit for writing the data determined not to be encrypted into the memory directly, and sending a first response signal from the memory when the writing of the file is finished.

47 Claims, 4 Drawing Sheets

SYSTEM AND METHOD FOR ACCESSING DISCRETE DATA

BACKGROUND OF INVENTION

1. Field of the Invention

The present invention relates to a system and related method for accessing data, and more particularly, to a system and related method for accessing discrete data while utilizing fewer CPU resources and increasing the speed of accessing memory.

2. Description of the Prior Art

The demand for memory for storing audio and video data increases with the maturity and the prevalence of digital audio and video facilities. Among all categories, flash memory is one of the most popular memory types. Flash memory is a kind of non-volatile random access memory (NVRAM), and the data stored within can be changed rapidly. During its lifetime, a flash memory is capable of changing the data stored inside several thousands of times to several hundreds of thousands times. In addition, the price of flash memory is cheap; so many products are equipped with it. Furthermore, flash memory is capable of deleting several million bytes of data at a time. Compared with other popular non-volatile random access memories that can delete only one byte of data at a time, such as electrically erasable programmable read-only memory (EEPROM), flash memory is undoubtedly a better memory device. Among the numerous kinds of memory devices, the Secure Digital Memory Card (SD card) wins its market by its small size, which is preferred by consumers, and the copy protection mechanism of AV facilities. The SD card is a memory device developed by Panasonic, Toshiba, and Sundisk. Compared with conventional memory devices, the encryption/decryption algorithm of the Content Protection for Recordable Media (CPRM) is adopted for avoiding illegal copy and transmitting. The SD card is wildly applied in audio players, such as MPEG Layer3 (MP3) players.

The audio file is discrete data composed of a plurality of frames. When a player accesses data stored in a SD card, it needs to encrypt and decrypt the data frame by frame, which wastes a lot of resources of the central process unit (CPU) and wastes processing time. Please refer to FIG. 1. FIG. 1 is a diagram of an MPEG3 file 100. Reference number 102 is the file header of the file 100. Reference numbers 110 and 120 are the first two frames of the file 100, and there are more frames contained in the file 100. Every frame in the file 100 is similar to the frame 110 and the frame 120, including a frame header, a data block and a residual block. Reference numbers 112 and 122 are the frame headers of the frame 110 and the frame 120 respectively, and reference numbers 116 and 126 are the residual blocks of data parts of the frame 110 and the frame 120 respectively, wherein the remainder of the difference between the number of bytes of a frame and the number of bytes of the frame header divided by 8 is a first number, and the residual block is the set of the last first number bytes of the frame. For example, assume there are 432 bytes contained in the frame 110, and there are 4 bytes contained in the frame header 223. The remainder of (432−4)/8 is 4. So the residual block 116 will be the last 4 bytes of the frame 110, and there are 432−4−4=424 bytes contained in the data block 114. When encrypting the file 100 according to the CPRM algorithm and writing the encrypted file 100 into the SD card, the data blocks of all frames are written into the SD card after encryption, and the file header 102, all frame headers and all residual blocks are written into the SD card without encryption. Accordingly, when reading the file 100 encrypted according to CPRM algorithm from the SD card, the data block of all frames are written into the buffer after decryption, and the file header 102, all frame headers and all residual blocks are written into the buffer card without decryption.

When writing the file 100 into a SD card with conventional audio players, for example, when recording an audio file with a digital recorder, due to the aforementioned characteristic of the voice file, a digital signal processor (DSP) transforms the audio file into digital signals with a predetermined format and writes the file header 102 and the frames following the file header 102 into a buffer. Meanwhile, a CPU processes the data contained in the file 100 in turn. First of all, the CPU sends a write command of the file header 102 to the SD card, and writes the file header 102 into the SD card directly without encryption. When the writing is finished, the SD card will send a response signal. If the response signal is a writing succeeded signal, the CPU will send a write command of the frame header 112 of the frame 110 to the SD card, and write the frame header 112 into the SD card directly without encryption. When the writing is finished, the SD card will send a response signal. If the response signal is a writing succeeded signal, the CPU sends a write command of the data block 114 of the frame 110 to the SD card, sends the data block 114 into an encryption circuit, and then writes the encrypted data block 114 into the SD card. Similarly, when the writing is finished, the SD card will send a response signal. If the response signal is a writing succeeded signal, the CPU then sends a write command of the residual block 116 of the frame 110 to the SD card, and writes the residual block 116 into the SD card directly without encryption. Again, when the writing is finished, the SD card will send a response signal. If the response signal is a writing succeeded signal, the CPU processes the data of the frame 120 and other following frames according to the aforementioned procedure until all the frames contained in the file 100 have been written into the SD card.

Likewise, when a conventional audio player reads a file 100 from the SD card, for example, when an MP3 player plays an audio file recorded in the SD card, the CPU processes each data contained in the file 100 individually. First, the CPU sends a read command of the file header 102 to the SD card, and writes the file header 102 into the buffer directly without decryption. When the writing is finished, the SD card will send a response signal. If the response signal is a reading succeeded signal, the CPU then sends a read command of the frame header 112 of the frame 110 to the SD card, and writes the frame header 112 into the buffer directly without encryption. When the writing is finished, the SD card will send a response signal. If the response signal is a reading succeeded signal, the CPU sends a read command of the data block 114 of the frame 110 to the SD card, sends the data block 114 into an decryption circuit, and then writes the decrypted data block 114 into the buffer. Similarly, when the writing is finished, the SD card will send a response signal. If the response signal is a reading succeeded signal, the CPU then sends a read command of the residual block 116 of the frame 110 to the SD card, and writes the residual block 116 into the buffer directly without decryption. Again, when the writing is finished, the SD card will send a response signal. If the response signal is a reading succeeded signal, the CPU processes the data of the frame 120 and other following frames according to the aforementioned procedure until all the frames contained in the file 100 have been read from the SD card and written into the buffer. The DSP will process the data in the buffer simultaneously with the aforementioned procedure of the CPU, or the DSP will process the data after a predetermined amount of data have been written into the buffer.

It is easy to observe that in the prior art, for both reading a file from the SD card and writing a file into the SD card, the audio player needs to send a read command or a write command for each data contained in the file, read or write the data, and receive the response signal from the SD card. That is, the CPU needs to issue three commands for each data. Therefore, for each frame comprising a frame header, a data block and a residual block, and a file comprising N frames, the CPU has to issue 3×3×N commands totally both when writing the file and when reading the file, and the CPU has to write for 3×N times, which consumes a great deal of CPU resources and processing time.

SUMMARY OF INVENTION

It is therefore a primary objective of the claimed invention to provide a system and related method for accessing discrete data that costs less CPU resources and takes less processing time.

Briefly described, the claimed invention discloses a method for accessing discrete data. The method includes transmitting a write command to a memory, determining whether each data following a header of the file needs to be encrypted according to a data format of a file that is to be written into the memory, transmitting the file header and each data following the file header to a logic unit, turning on the logic unit for encrypting the data determined to be encrypted and writing the encrypted data into the memory, turning off the logic unit for writing the data determined not to be encrypted into the memory directly, and sending a first response signal from the memory when the writing of the file is finished.

The claimed invention further discloses a method for accessing discrete data. The method includes transmitting a read command to a memory, determining whether each data following the file header needs to be decrypted according to a data format recorded in a header of the file that is to be read from the memory, transmitting the file header and each data following the file header to a logic unit, turning on the logic unit for decrypting the data determined to be decrypted and writing the decrypted data into a buffer, turning off the logic unit for writing the data determined not to be decrypted into the buffer directly, and sending a first response signal from the memory when the writing of the file is finished.

The claimed invention still discloses a discrete data accessing system. The system includes a memory for storing data, a first logic unit electrically connected to the memory for encrypting input data according to a predetermined encryption algorithm, writing the encrypted data into the memory, or writing input data into the memory directly, and a second logic unit electrically connected to the first logic unit for determining whether each data following a header of a file that is to be written into the memory needs to be encrypted according to a data format of the file in order to decide whether to turn on the first logic unit for encrypting the input data and writing the encrypted data into the memory, or to turn off the first logic unit for writing the input data into the memory directly.

The claimed invention further discloses a discrete data accessing system. The system includes a memory for storing data, a buffer for storing data, a first logic unit electrically connected to the buffer for decrypting input data according to a predetermined decryption algorithm and writing the decrypted data into the buffer, or writing the input data into the buffer directly, and a second logic unit electrically connected to the first logic unit for determining whether each data following a header of a file that is to be read from the memory needs to be decrypted according to a data format recorded in the file header in order to decide whether to turn on the decryption function of the first logic unit for decrypting the input data from the memory and writing the decrypted data into the buffer, or to turn off the decryption function of the first logic unit for writing the input data from the memory into the buffer directly.

It is an advantage of the claimed invention that the encryption function of the encryption unit and the decryption function of the decryption unit can be switched on/off to encrypt and decrypt the data or just directly pass the data. This way, the data contained in the file can be accessed continuously, and the number memory accesses can be reduced.

These and other objectives of the present invention will no doubt become obvious to those of ordinary skill in the art after reading the following detailed description of the preferred embodiments that are illustrated in the various figures and drawings.

DETAILED DESCRIPTION

The main characteristic of the present invention involves transmitting all data into an encryption circuit, and switching on/off the encryption function of the encryption circuit according to the adopted encryption algorithm and the format of the file by a control unit. Each data is sent into the encryption circuit and written into the SD card with/without encryption according to the status of the encryption circuit. The control unit contained in the claimed invention may be achieved by software. Compared with the prior art, the present invention inputs each data into the encryption circuit and then outputs to the SD card continuously and in turns. Therefore, it is not necessary to issue write commands for every single data, but it is only needed to issue a write command in the beginning of the writing of the whole file. Accordingly, the procedure is simplified dramatically and the CPU resources are saved without increasing the buffer.

Figure 1:
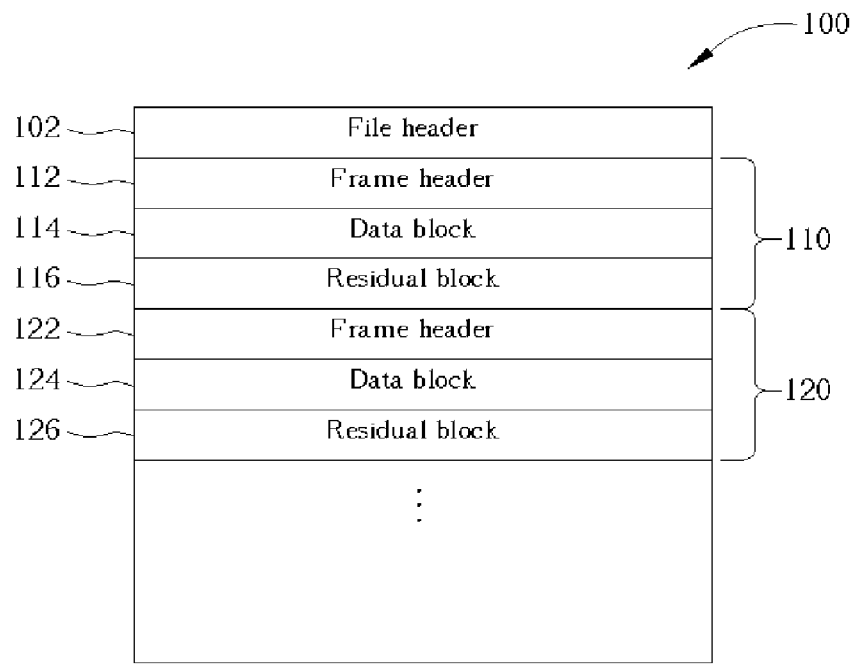
FIG. 1 is a diagram of an MPEG3 file.
Figure 2:
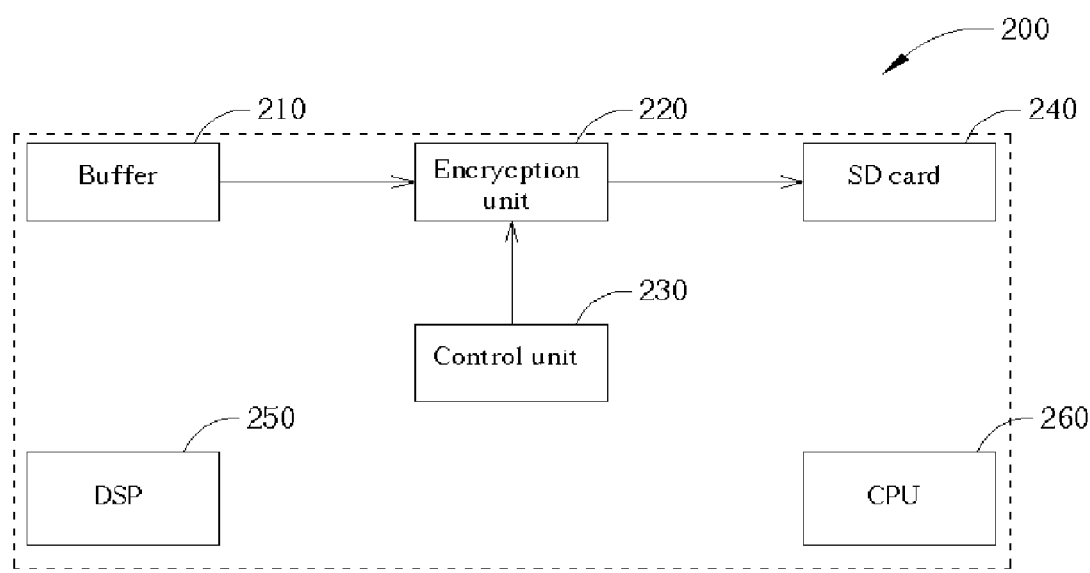
FIG. 2 is a block diagram of the first embodiment of the present invention discrete data accessing system.

Please refer to FIG. 2. FIG. 2 is a block diagram of the first embodiment of the present invention discrete data accessing system. Reference number 200 is a digital audio player. As illustrated in FIG. 2, the audio player 200 contains a buffer 210, an encryption unit 220, a control unit 230, a SD card 240, a DSP 250 and a CPU 260. When writing a file into the SD card 240 with the present digital audio players 200, for example, when recording an audio file by a digital recorder, the DSP 250 transforms the voice file into digital discrete signals with a predetermined format and writes the file header and the data following the file header into the buffer 210. Meanwhile, the CPU 260 sends a write command to the SD card, and then processes the data stored in the buffer 210 in turn, that is, transmits the file header, the headers, the data blocks and the residual bocks of all frames into the encryption unit 220. When a digital recorder records an audio file, the data format of the file to be recorded is set in advance. Consequently, the lengths of each data, such as the length of the file header, the length of the frame header, the lengths of the data block and the residual block of each frame, are known. The control unit 230 switches on/off the encryption function of the encryption unit 220 according to the length of each data and the rule of the adopted encryption algorithm. Therefore, the data contained in the file to be written into the SD card 240 can be transmitted into the encryption unit 220 continuously, and then be written into the SD card 240 after being encrypted by the encryption unit 220, or be directly passed to the SD card 240. Assume the CPRM algorithm is adopted for encryption. When a header of some frame is input to the encryption unit 220, the control unit 240 turns off the encryption function of the encryption unit 220, such that the frame header is passed to the SD card 240 without encryption and written into the SD card 240 directly. When the data block of the frame is next transmitted to the encryption unit 220, the control unit 220 turns on the encryption function of the encryption unit 220, such that the data block is first encrypted then output to the SD card 240. Further, when the residual block of the frame is next input to the encryption unit 220, the control unit 240 turns off the encryption function of the encryption unit 220 again, such that the residual block is passed to the SD card 240. When all data contained in the file have been written into the SD card 240, the SD card 240 sends out a writing succeeded signal. The procedure of writing a file is finished then.

The present invention can be applied to reading a file from a memory. When reading a file from the SD card, the present invention transmits each data contained in the file to a decryption circuit. A control unit is utilized to switch on/off the decryption function of the decryption unit according to the data format of the file indicted by the file header and the rule of the adopted decryption algorithm. Each data transmitted into the decryption circuit is decrypted and then written to the buffer or just directly passed to the buffer according to whether the decryption function of the decryption circuit is switched on or off. Similarly, compared with the conventional scheme of reading files from the SD card, each of the data is transmitted to the decryption circuit continuously and in turn. Therefore, there is no need to issue read commands of every single data, and only one read command is needed in the beginning of reading the file.

Figure 3:
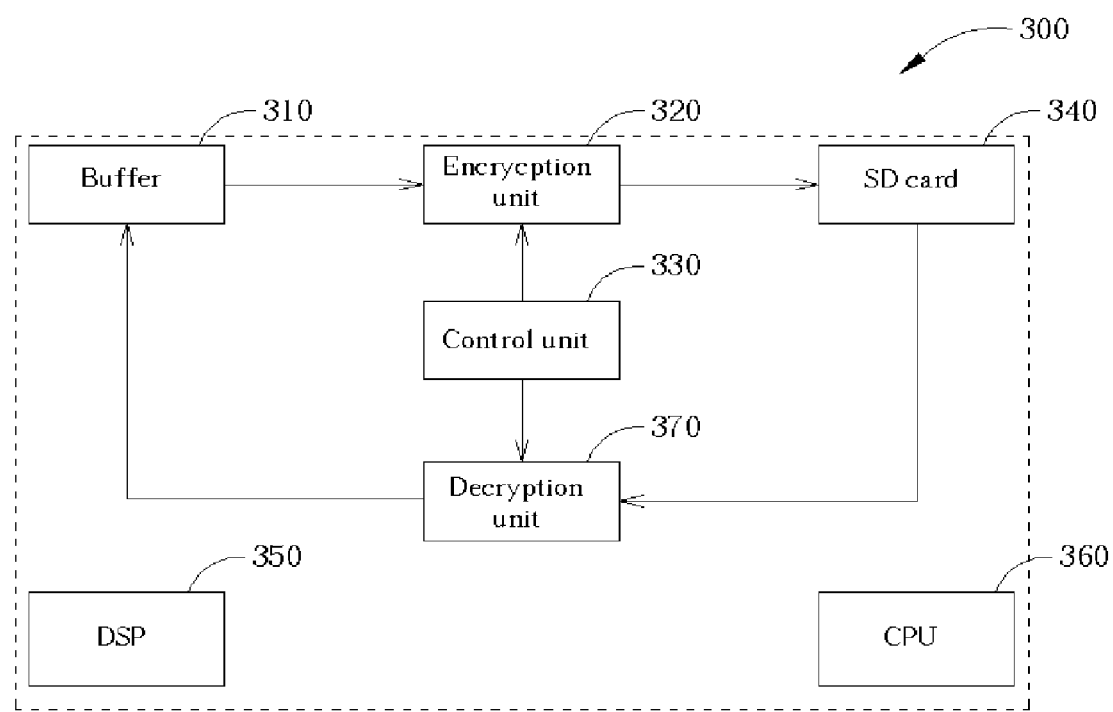
FIG. 3 is a block diagram of the second embodiment of the present invention discrete data accessing system.

Please refer to FIG. 3. FIG. 3 is a block diagram of the second embodiment of the present invention discrete data accessing system. Reference number 300 is a digital audio player. As illustrated in FIG. 3, the audio player 300 comprises a buffer 310, an encryption unit 320, a control unit 330, a SD card 340, a DSP 350, a CPU 360, and a decryption unit 370. When the digital audio player 300 is going to read a file from the SD card 340, for example, when an MP3 player is going to play a song stored in the SD card, the CPU 360 transmits a read command to the SD card, then transmits the file header, the header, the data block and the residual block of each frame to the decryption unit 370. The CPU 360 gets the knowledge of the format of the file from the header, that is, the knowledge of the lengths of each data contained in the file and the corresponding regulation according to the adopted decryption algorithm. Therefore, the control unit 330 is capable of switching on/off the decryption function of the decryption unit 370 according to the information stored in the file header, such that the data contained in the file to be read from the SD card 340 can be input to the decryption unit 370 successively, be decrypted correctly and then written into the buffer 310, or be written into the buffer 310 directly without decryption. After that, the DSP 350 transforms the file written into the buffer 310 to a playable voice file. For instance, assume the adopted decryption algorithm is the CPRM algorithm. When a header of some frame is input to the decryption unit 370, the control unit 330 turns off the decryption function of the decryption unit 370, such that the frame header is passed to the buffer 310 without decryption. When the data block of the frame is next input to the decryption unit 370, the control unit 330 turns on the decryption function of the decryption unit 370 such that the data block is output to the buffer 310 after being decrypted. Further, when the residual block of the frame is next input to the decryption unit 370, the control unit 330 turns off the decryption function of the decryption unit 370 again, such that the residual block is passed to the buffer 310 without decryption. When all data contained in the file has been written to the buffer 310, the SD card 340 sends out a read succeeded signal. The procedure of reading a file is finished then.

Figure 4:
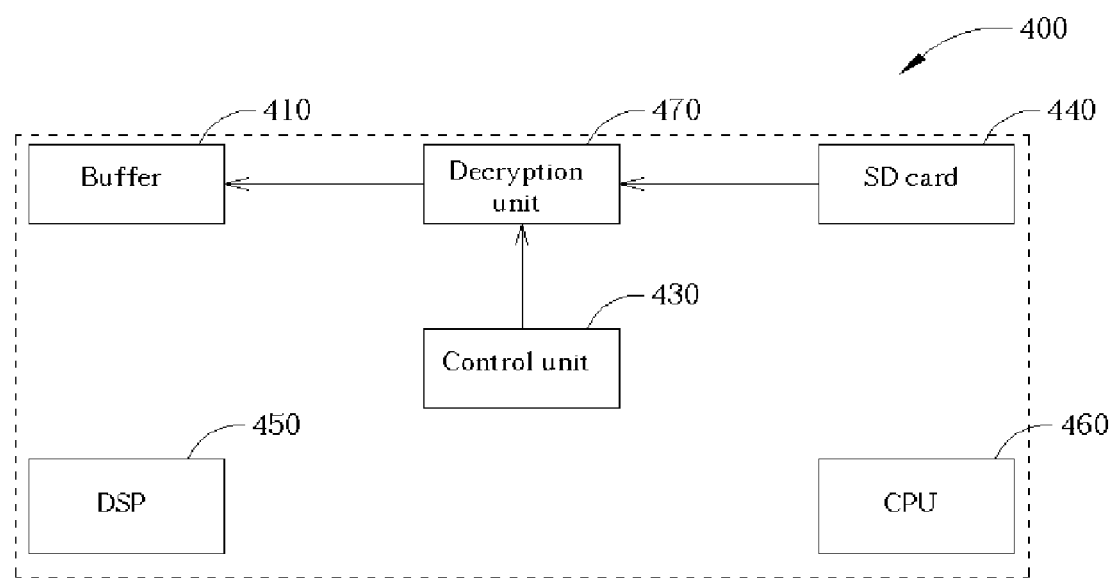
FIG. 4 is a block diagram of the third embodiment of the present invention discrete data accessing system.

The claimed invention may be applied to some playing-only system, such as an MP3 player without recording function. Please refer to FIG. 4. FIG. 4 is a block diagram of the third embodiment of the present invention discrete data accessing system. Reference number 400 is a digital audio player without recording function. The digital audio player 400 comprises a buffer 410, a control unit 430, a SD card 440, a DSP 450, a CPU 460 and a decryption unit 470. Compared to the digital player 300 illustrated in FIG. 3, the digital audio player 400 is not equipped with the encryption unit that is needed in writing files to the SD card, and the scenario of reading files from the SD card 440 is as the same as the description of the embodiment illustrated in FIG. 3.

According to the CPRM algorithm, the residual blocks and the frame headers do not need to be encrypted. This is the reason why when writing a file into a SD card, the encryption function of the encryption unit can be turned off while the CPU contained in the claimed invention may send the residual block of one frame and the frame header of the next frame to the encryption unit continuously. This way, the number of memory accesses may be reduced further. For instance, when writing a file comprising N frames, data only needs to be written 2N+1 times, which is much lower than the 3N times in the prior art.

There may be a plurality of buffers contained in the present system. When writing a file into a SD card, the DSP writes frames of the file to the first buffer until the first buffer is full. After that, the DSP writes data into the second buffer. For the CPU side, the CPU first writes the data stored in the first buffer to the SD card, and writes the data stored in the next buffer to the SD card. The CPU needs to send a write command in the beginning of writing the file to the SD card as well.

Figure 5:
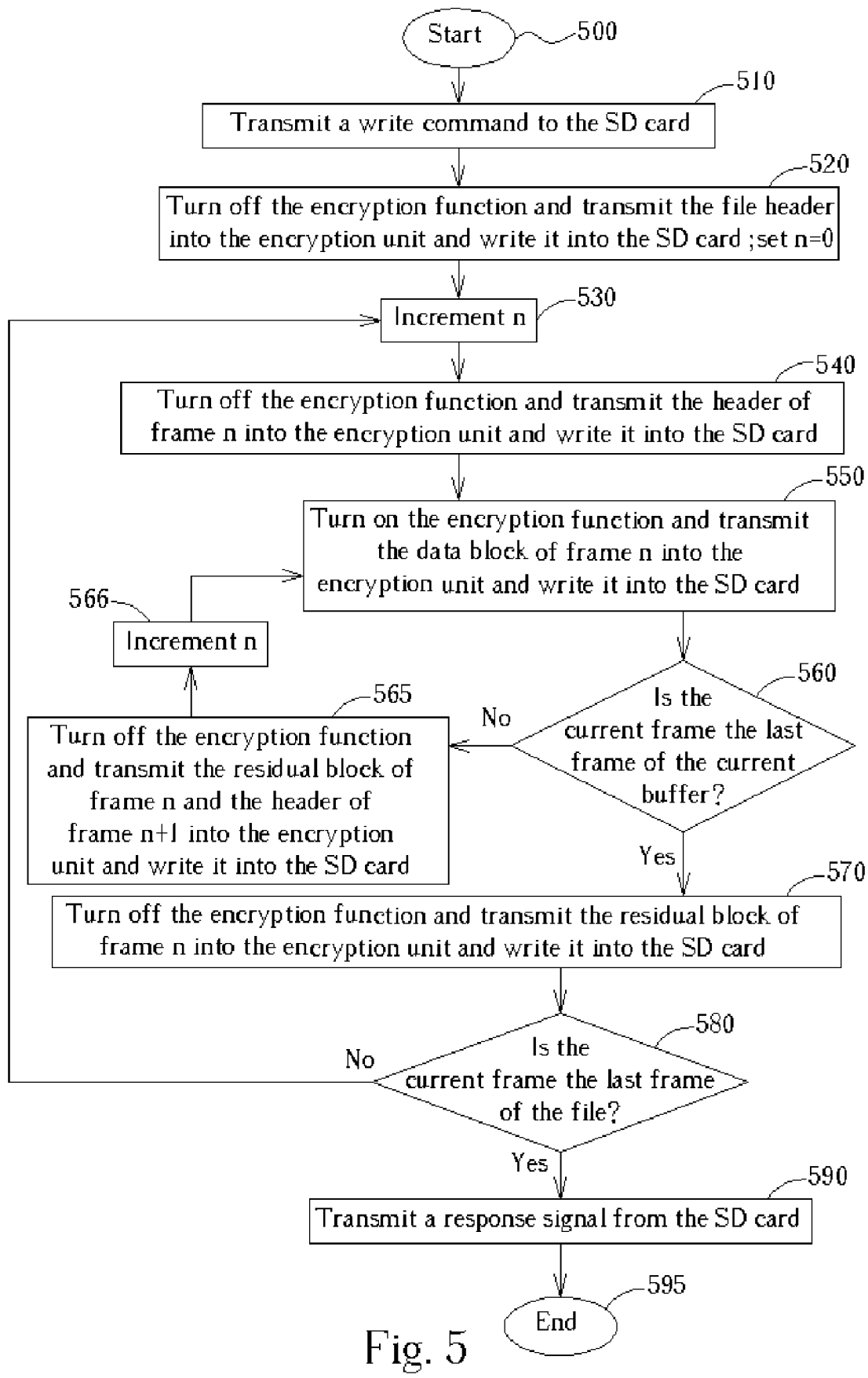
FIG. 5 is the flowchart of the present invention writing a file into a SD card.

Please refer to FIG. 5. FIG. 5 is the flowchart of the present invention writing a file into a SD card.

Step 500: Start writing a file into the SD card;

Step 510: Transmit a write command to a SD card;

Step 520: Turn off the encryption function of the encryption unit and transmit the file header into the encryption unit and write it into the SD card; set n=0;

Step 530: Increment n;

Step 540: Turn off the encryption function of the encryption unit and transmit the header of frame n into the encryption unit and write it into the SD card without encryption;

Step 550: Turn on the encryption function of the encryption unit and transmit the data block of frame n into the encryption unit and write it into the SD card;

Step 560: If the frame just written into the SD card is the last frame of the current buffer, go to step 570; else go to step 565;

Step 565: Turn off the encryption function of the encryption unit and transmit the residual block of frame n and the header of frame n+1 into the encryption unit and write it into the SD card without encryption;

Step 566: Increment n; go to step 550;

Step 570: Turn off the encryption function of the encryption unit and transmit the residual block of frame n into the encryption unit and write it into the SD card without encryption;

Step 580: If the frame just written into the SD card is the last frame of the file, go to step 590; else go to step 530;

Step 590: Transmit a response signal from the SD card;

Step 595: End.

If in step 580 it is found that there is a frame that has not been written into the SD card, then increment n in step 530, and transmit data in the next buffer into the encryption unit and write it into the SD card in step 540.

Figure 6:
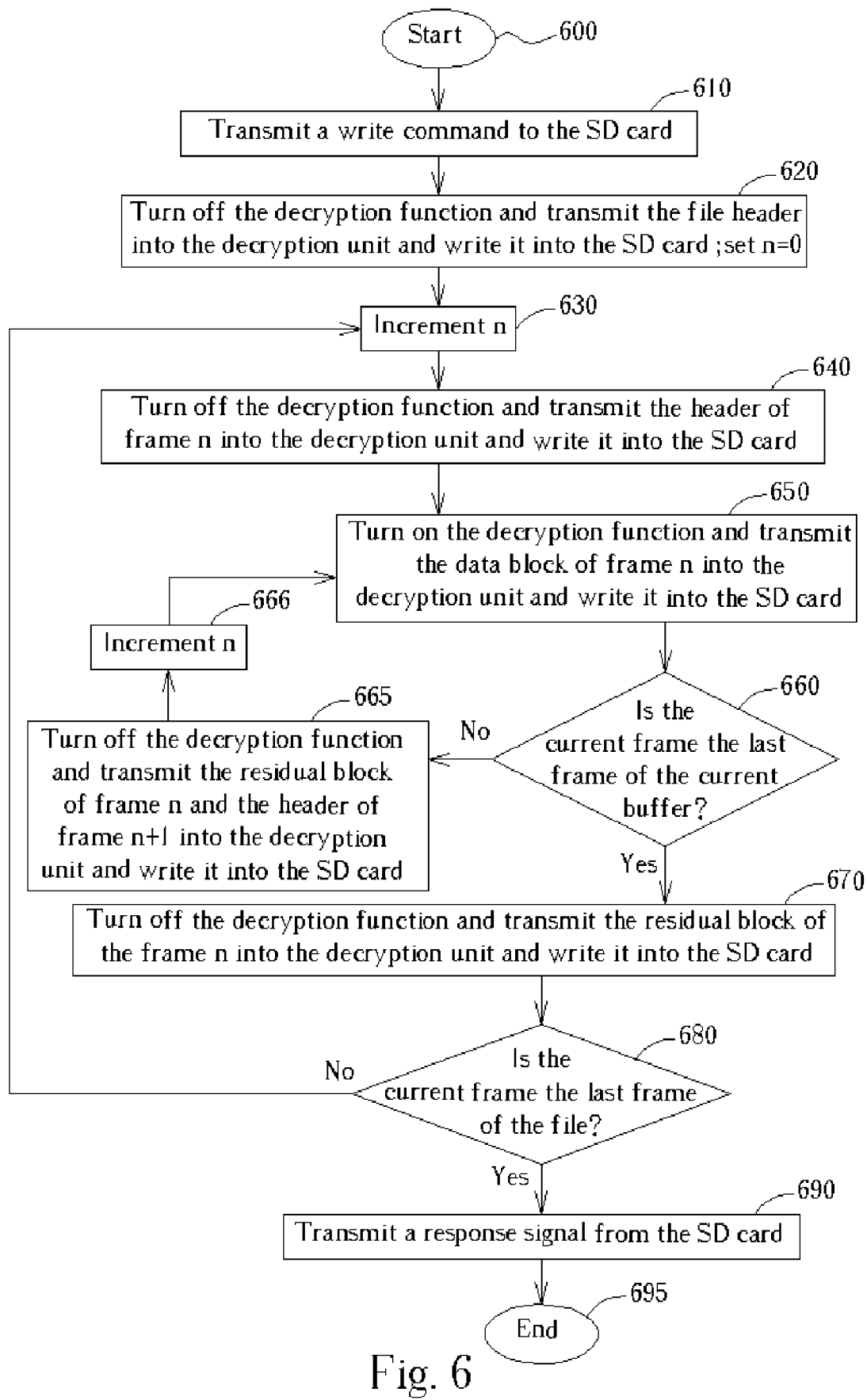
FIG. 6 is the flowchart of the present invention reading a file into a SD card.

When reading a file in the SD card, the claimed CPU reads the data in the SD card and writes to the first buffer. Then the CPU reads the following data and writes to the next buffer. Similarly, according to the claimed method, it is only needed to transmit a read command in the beginning of reading the file from the SD card. Please refer to FIG. 6. FIG. 6 is the flowchart of the present invention reading a file into a SD card.

Step 600: Start reading a file from the SD card;

Step 610: Transmit a write command to a memory;

Step 620: Turn off the decryption function of the decryption unit and transmit the file header into the decryption unit and write it into the SD card; set n=0;

Step 630: Increment n;

Step 640: Turn off the decryption function of the decryption unit and transmit the header of frame n into the decryption unit and write it into the SD card;

Step 650: Turn on the decryption function of the decryption unit and transmit the data block of frame n into the decryption unit and write it into the SD card;

Step 660: If the frame just read from the buffer is the last frame of the current buffer, go to step 670; else go to step 665;

Step 665: Turn off the decryption function of the decryption unit and transmit the residual block of frame n and the header of frame n+1 into the decryption unit and write it into the SD card;

Step 666: Increment n; go to step 650;

Step 670: Turn off the decryption function of the decryption unit and transmit the residual block of frame n into the decryption unit and write it into the SD card;

Step 680: If the frame just read from the SD card is the last frame of the file, go to step 690; else go to step 630;

Step 690: Transmit a response signal from the SD card;

Step 695: End.

If in step 680 it is found that there is a frame that has not been written into the buffer, then increment n in step 630, and transmit data to the decryption unit and write it into the next buffer in step 640.

In digital data accessing, some CPUs store data in the little-endian format, and some CPUs store data in the big-endian format. Therefore, in the present invention system, a function of changing the storing format may be further contained in the encryption unit and the decryption unit. For instance, after encrypting the data that is determined to be encrypted, according to the order of the CPU, the encryption unit may change the data format from little-endian to big-endian, or change the data format from big-endian to little-endian before writing the encrypted data into the memory. Similarly, after decrypting the data that is determined to be decrypted, according to the order of the CPU, the decryption unit may change the data format from little-endian to big-endian, or change the data format from big-endian to little-endian before outputting the decrypted data into the buffer.

In summary, the present invention introduces a discrete data accessing system and related method capable of reducing the usage of CPU resources. As illustrated before, according to the CPRM algorithm, the residual blocks and the frame headers do not need to be encrypted. Since the encryption function of the encryption unit and the decryption function of the decryption unit may be turned on/off under the control of the CPU, the CPU contained in the claimed invention may send the residual block of one frame and the frame header of the next frame to the encryption unit and the decryption unit continuously. This way, the number of memory accesses may be reduced. Therefore, when writing or reading a file comprising N frames, data only needs to be written or read 2N+1 times, which is much lower than the 3N times in the prior art, and only 3 commands are needed, which is much lower than 3×N×N commands in the prior art. The memory contained in the present invention may be a secure digital memory card (SD card) or other kind of flash memory. The data to be accessed may be an audio file, a video file or other kind of discrete data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for accessing discrete data comprising:

(a) transmitting a write command to a memory;

(b) according to a data format of a file that is to be written into the memory, determining whether each data following a header of the file needs to be encrypted, and transmitting the file header and each data following the file header to a logic unit, wherein the data following the file header comprises one or a plurality of frames, in which each frame comprises a header, a data block and a residual block, wherein a remainder of a difference between the number of bytes of a frame and the number of bytes of the frame header divided by a predetermined integer is a first number, and the residual block is a set of the last first number bytes of the frame, wherein the frame header and the residual block of each frame are determined not to be encrypted, and the data block of each frame is determined to be encrypted;

(c) turning on the logic unit for encrypting the data determined to be encrypted in step (b) and writing the encrypted data into the memory;

(d) turning off the logic unit for writing the data determined not to be encrypted in step (b) into the memory directly; and (e) sending a first response signal from the memory when writing of the file is finished.

2. The method of claim 1 wherein the first response signal is a writing succeeded signal.

3. The method of claim 1 transmitting the file header and each data following the file header from a plurality of buffers in turn to the logic unit in step (b).

4. The method of claim 1 wherein step (c) further comprises changing a data format from little-endian to big-endian, or changing a data format from big-endian to little-endian before writing the encrypted data into the memory.

5. The method of claim 1 wherein an encryption algorithm is performed according to a specification of content protection for recordable media (CPRM).

6. The method of claim 1 further comprising:
(f) transmitting a read command to the memory;
(g) according to a data format recorded in a header of a file that is to be read from the memory, determining whether each data following the file header needs to be decrypted, and transmitting the file header and each data following the file header to a logic unit, wherein the data following the file header comprises one or a plurality of frames, wherein each frame comprises a header, a data block and a residual block, wherein the remainder of the difference between the number of bytes of a frame and the number of bytes of the frame header divided by the predetermined integer is a first number, and the residual block is the set of the last first number bytes of the frame, wherein the header and the residual block of each frame are determined not to be decrypted, and the data block of each frame is determined to be decrypted;
(h) turning on the logic unit for decrypting the data determined to be decrypted in step (g) and writing the decrypted data into a buffer;
(i) turning off the logic unit for writing the data determined not to be decrypted in step (g) into the buffer directly; and
(j) sending a second response signal from the memory when the writing of the file is finished.

7. The method of claim 6 wherein the second response signal is a reading succeeded signal.

8. The method of claim 6 wherein the logic unit writes the data into a plurality of buffers in turn.

9. The method of claim 6 wherein step (h) further comprises changing the data format from little-endian to big-endian, or changing the data format from big-endian to little-endian before writing the decrypted data into the buffer.

10. The method of claim 7 wherein the decryption algorithm is performed according to the specification of content protection for recordable media.

11. The method of claim 1 wherein the memory is a flash memory.

12. The method of claim 1 wherein the memory is a secure digital (SD) card.

13. The method of claim 1 wherein the memory is a digital video disk (DVD).

14. The method of claim 1 wherein the file is an audio file.

15. The method of claim 1 wherein the file is a video file.

16. A method for accessing discrete data comprising:
(a) transmitting a read command to a memory;
(b) according to a data format recorded in a header of the file that is to be read from the memory, determining whether each data following the file header needs to be decrypted, and transmitting the file header and each data following the file header to a logic unit, wherein the data following the file header comprises one or a plurality of frames, wherein each frame comprises a header, a data block and a residual block, wherein a remainder of a difference between the number of bytes of a frame and the number of bytes of the frame header divided by a predetermined integer is a first number, and the residual block is a set of the last first number bytes of the frame, wherein the frame header and the residual block of each frame are determined not to be decrypted, and the data block of each frame is determined to be decrypted;
(c) turning on the logic unit for decrypting the data determined to be decrypted in step (b) and writing the decrypted data into a buffer;
(d) turning off the logic unit for writing the data determined not to be decrypted in step (b) into the buffer directly; and
(e) sending a first response signal from the memory when the writing of the file is finished.

17. The method of claim 16 wherein the first response signal is a reading succeeded signal.

18. The method of claim 16 wherein the logic unit writes the data into a plurality of buffers in turn.

19. The method of claim 16 wherein step (c) further comprises changing the data format from little-endian to big-endian, or changing a data format from big-endian to little-endian before writing the decrypted data into the buffer.

20. The method of claim 16 wherein the memory is a flash memory.

21. The method of claim 16 wherein the memory is a secure digital (SD) card.

22. The method of claim 16 wherein the memory is a digital video disk (DVD).

23. The method of claim 16 wherein the method of decryption is performed according to the decryption algorithm of the specification of content protection for recordable media.

24. The method of claim 16 wherein the file is an audio file.

25. The method of claim 16 wherein the file is a video file.

26. A discrete data accessing system comprising:
a memory for storing data;
a first logic unit electrically connected to the memory for encrypting input data according to a predetermined encryption algorithm, writing the encrypted data into the memory, or writing input data into the memory directly; and
a second logic unit electrically connected to the first logic unit for determining whether each data following a header of a file that is to be written into the memory needs to be encrypted according to a data format of the file in order to decide whether to turn on the first logic unit for encrypting the input data and writing the encrypted data into the memory, or to turn off the first logic unit for writing the input data into the memory directly, wherein the data following the file header comprises one or a plurality of frames, wherein each frame comprises a header, a data block and a residual block, in which a remainder of a difference between the number of bytes of a frame and the number of bytes of the frame header divided by a predetermined integer is a first number, and the residual block is a set of the last first number bytes of the frame, wherein the frame header and the residual block of each frame are determined not to be encrypted, and the data block of each frame is determined to be encrypted by the second logic unit.

27. The system of claim 26 wherein the first logic unit is further capable of changing a data format from little-endian to big-endian, or changing a data format from big-endian to little-endian before writing the encrypted data into the memory.

28. The system of claim 26 wherein an encryption algorithm is performed according to a specification of content protection for recordable media.

29. The system of claim 26 further comprising a buffer wherein the first logic unit is further capable of decrypting input data according to a predetermined decryption algorithm and writing the decrypted data into the buffer, or writing the input data into the buffer directly, and the second logic unit is further capable of determining whether each data following a header of a file that is to be read from the memory needs to be decrypted according to a data format recorded in the file header in order to decide whether to turn on a decryption function of the first logic unit for decrypting the input data and writing the decrypted data into the buffer, or to turn off the decryption function of the first logic unit for writing the input data into the buffer directly, wherein the data following the file header comprises one or a plurality of frames, in which each frame comprises a header, a data block and a residual block, wherein the remainder of the difference between the number of bytes of a frame and the number of bytes of the frame header divided by the predetermined integer is a first number, and the residual block is the set of the last first number bytes of the frame, wherein the header and the residual block of each frame are determined not to be decrypted, and the data block of each frame is determined to be decrypted by the second logic unit.

30. The system of claim 29 wherein the first logic unit is further capable of changing a data format from little-endian to big-endian, or changing a data format from big-endian to little-endian before writing the decrypted data into the buffer.

31. The system of claim 29 wherein an decryption algorithm is performed according to a specification of content protection for recordable media.

32. The system of claim 26 further comprising a buffer and a third logic unit wherein the third logic unit is capable of decrypting input data according to a predetermined decryption algorithm and writing the decrypted data into the buffer, or writing the input data into the buffer directly, and the second logic unit is further capable of determining whether each data following a header of a file that is to be read from the memory needs to be decrypted according to a data format recorded in the file header in order to decide whether to turn on a decryption function of the third logic unit for decrypting the input data and writing the decrypted data into the buffer, or to turn off the decryption function of the third logic unit for writing the input data into the buffer directly, wherein the data following the file header comprises one or a plurality of frames, in which each frame comprises a header, a data block and a residual block, wherein the remainder of the difference between the number of bytes of a frame and the number of bytes of the frame header divided by the predetermined integer is a first number, and the residual block is the set of the last first number bytes of the frame, wherein the header and the residual block of each frame are determined not to be decrypted, and the data block of each frame is determined to be decrypted by the second logic unit.

33. The system of claim 32 wherein the third logic unit is further capable of changing a data format from little-endian to big-endian, or changing a data format from big-endian to little-endian before writing the decrypted data into the buffer.

34. The system of claim 32 wherein an decryption algorithm is performed according to a specification of content protection for recordable media.

35. The system of claim 26 wherein the memory is a flash memory.

36. The system of claim 26 wherein the memory is a secure digital (SD) card.

37. The system of claim 26 wherein the memory is a digital video disk (DVD).

38. The system of claim 26 wherein the file is an audio file.

39. The system of claim 26 wherein the file is a video file.

40. A discrete data accessing system comprising:
a memory for storing data;
a buffer for storing data;
a first logic unit electrically connected to the buffer for decrypting input data according to a predetermined decryption algorithm and writing the decrypted data into the buffer, or writing the input data into the buffer directly; and
a second logic unit electrically connected to the first logic unit for determining whether each data following a header of a file that is to be read from the memory needs to be decrypted according to a data format recorded in the file header in order to decide whether to turn on a decryption function of the first logic unit for decrypting the input data from the memory and writing the decrypted data into the buffer, or to turn off the decryption function of the first logic unit for writing the input data from the memory into the buffer directly, wherein the data following the file header comprises one or a plurality of frames, in which each frame comprises a header, a data block and a residual block, wherein a remainder of a difference between the number of bytes of a frame and the number of bytes of the frame header divided by a predetermined integer is a first number, and the residual block is a set of the last first number bytes of the frame, wherein the frame header and the residual block of each frame are determined not to be decrypted, and the data block of each frame is determined to be decrypted by the second logic unit.

41. The system of claim 40 wherein the first logic unit is further capable of changing a data format from little-endian to big-endian, or changing a data format from big-endian to little-endian before writing the decrypted data into the buffer.

42. The system of claim 40 wherein the predetermined decryption algorithm is performed according to a specification of content protection for recordable media.

43. The system of claim 40 wherein the memory is a flash memory.

44. The system of claim 40 wherein the memory is a secure digital (SD) card.

45. The system of claim 40 wherein the memory is a digital video disk (DVD).

46. The system of claim 40 wherein the file is an audio file.

47. The system of claim 40 wherein the file is a video file.

* * * * *